US012189131B2

(12) United States Patent
Ge et al.

(10) Patent No.: US 12,189,131 B2
(45) Date of Patent: Jan. 7, 2025

(54) WEARABLE DEVICE AND FRAME STRUCTURE THEREOF

(71) Applicant: BOE Technology Group Co., Ltd., Beijing (CN)

(72) Inventors: Zheng Ge, Beijing (CN); Zhanshan Ma, Beijing (CN); Yuhong Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,769

(22) PCT Filed: May 17, 2021

(86) PCT No.: PCT/CN2021/094160
§ 371 (c)(1),
(2) Date: Jun. 24, 2022

(87) PCT Pub. No.: WO2022/241618
PCT Pub. Date: Nov. 24, 2022

(65) Prior Publication Data
US 2024/0192504 A1    Jun. 13, 2024

(51) Int. Cl.
*G02B 27/01* (2006.01)
*G02C 11/00* (2006.01)
*G06F 1/16* (2006.01)

(52) U.S. Cl.
CPC .......... *G02B 27/0176* (2013.01); *G02C 11/10* (2013.01); *G06F 1/163* (2013.01); *G02B 2027/0178* (2013.01)

(58) Field of Classification Search
CPC ........ G02B 27/0176; G02B 2027/0178; G02C 11/10; G06F 1/163
See application file for complete search history.

(56) References Cited

U.S. PATENT DOCUMENTS

| 4,869,575 | A | * | 9/1989 | Kubik | G02C 9/04 |
| | | | | | 359/431 |
| 8,038,292 | B2 | * | 10/2011 | Matsumoto | G02C 5/20 |
| | | | | | 351/158 |
| 8,344,965 | B2 | * | 1/2013 | Matsumoto | G02B 27/0176 |
| | | | | | 345/5 |
| 10,067,359 | B1 | | 9/2018 | Ushakov | |
| 10,281,727 | B2 | * | 5/2019 | Hiraide | G02B 27/0172 |
| 2009/0146916 | A1 | * | 6/2009 | Moliton | G02B 27/0176 |
| | | | | | 345/8 |

(Continued)

FOREIGN PATENT DOCUMENTS

| CN | 101614236 A | 12/2009 |
| CN | 104914578 A | 9/2015 |

(Continued)

*Primary Examiner* — Rockshana D Chowdhury
*Assistant Examiner* — Martin Antonio Asmat Uceda
(74) *Attorney, Agent, or Firm* — Lippes Mathias LLP

(57) ABSTRACT

Provided is a frame structure of a wearable device. The frame structure includes: a frame body; a temple rotatably connected to the frame body; a fixing bracket fixedly connected to the frame body; and a mounting bracket disposed on a side, distal from the frame body, of the fixing bracket and rotatably connected to the fixing bracket; wherein the mounting bracket is configured to be fixedly connected to a body structure of the wearable device.

18 Claims, 7 Drawing Sheets

(56) References Cited

U.S. PATENT DOCUMENTS

| | | | |
|---|---|---|---|
| 2009/0251661 A1* | 10/2009 | Fuziak, Jr. | G02C 5/001 351/158 |
| 2009/0320243 A1* | 12/2009 | Wang | G06F 1/1616 16/303 |
| 2010/0073262 A1* | 3/2010 | Matsumoto | G02B 27/0176 345/8 |
| 2010/0245754 A1* | 9/2010 | Matsumoto | G02B 27/0176 351/158 |
| 2015/0261015 A1 | 9/2015 | Han et al. | |
| 2016/0033792 A1* | 2/2016 | Blum | G02C 11/10 351/158 |
| 2016/0187660 A1* | 6/2016 | Hiraide | G02B 27/0176 359/630 |

FOREIGN PATENT DOCUMENTS

| | | |
|---|---|---|
| CN | 206301082 U | 7/2017 |
| CN | 207133509 U | 3/2018 |
| CN | 207937712 U | 10/2018 |
| CN | 209446888 U | 9/2019 |
| CN | 209650184 U | 11/2019 |
| CN | 110785696 A | 2/2020 |
| CN | 210199412 U | 3/2020 |
| CN | 111240042 A | 6/2020 |

\* cited by examiner

WEARABLE DEVICE AND FRAME STRUCTURE THEREOF

CROSS-REFERENCE TO RELATED APPLICATION

This application is a 371 of PCT application No. PCT/CN2021/094160, filed on May 17, 2021, the content of which is incorporated herein by reference in its entirety.

TECHNICAL FIELD

The present disclosure relates to the field of mechanical technologies, and in particular, relates to a wearable device and a frame structure thereof.

BACKGROUND

A wearable device generally includes a frame structure and a body structure. The frame structure is used for a user to wear the wearable device.

SUMMARY

Embodiments of the present disclosure provide a wearable device and a frame structure thereof. The technical solutions are as follows.

In one aspect, a frame structure of a wearable device is provided. The frame structure includes:
a frame body;
a temple rotatably connected to the frame body;
a fixing bracket fixedly connected to the frame body; and
a mounting bracket disposed on a side, distal from the frame body, of the fixing bracket and rotatably connected to the fixing bracket;
wherein the mounting bracket is configured to be fixedly connected to a body structure of the wearable device.

Optionally, the frame structure further includes: a first rotating assembly;
wherein the first rotating assembly is disposed between the fixing bracket and the mounting bracket and is fixedly connected to both the fixing bracket and the mounting bracket, and the mounting bracket and the fixing bracket are rotatably connected by the first rotating assembly.

Optionally, the first rotating assembly includes: a first fixing member, a first connecting member in a rod shape, a second fixing member, and a second connecting member that are arranged in sequence; wherein
one side of the first fixing member is fixedly connected to the fixing bracket, and the other side of the first fixing member is fixedly connected to one end of the first connecting member;
the second fixing member is provided with a first through hole, and the other end of the first connecting member is fixedly connected to the second connecting member through the first through hole; and
the second fixing member is fixedly connected to the mounting bracket.

Optionally, the first rotating assembly further includes: a limiting member disposed between the first fixing member and the second fixing member, wherein the limiting member is provided with a second through hole and a limiting portion;
the other end of the first connecting member is fixedly connected to the second connecting member through the second through hole and the first through hole in sequence; and a side, proximal to the limiting member, of the second fixing member is provided with a limiting boss, wherein the limiting boss is configured to be engaged with the limiting portion.

Optionally, the first rotating assembly further includes: a first gasket and a second gasket; wherein
the first gasket is disposed between the second fixing member and the second connecting member, and the second gasket is disposed between the first gasket and the second connecting member; and
one side of the first gasket is in contact with the second fixing member, the other side of the first gasket is in contact with one side of the second gasket, and the other side of the second gasket is in contact with the second connecting member.

Optionally, the frame body includes: a frame beam, and a first connecting portion and a second connecting portion that are disposed at both ends of the frame beam; wherein
one end of the frame beam is fixedly connected to the first connecting portion, and the other end of the frame beam is fixedly connected to the second connecting portion; and
the fixing bracket is fixedly connected to the first connecting portion.

Optionally, the fixing bracket is provided with a third through hole, the first connecting portion is provided with a fourth through hole, and the fixing bracket and the first connecting portion are fixedly connected through the third through hole and the fourth through hole.

Optionally, the frame structure further includes: a wire clip;
wherein the wire clip is fixedly connected to the temple, and is configured to fix a data line of the body structure.

Optionally, the wire clip is fixedly connected to an end, distal from the frame body, of the temple.

Optionally, the wire clip and the temple are integrally formed.

Optionally, the frame structure further includes: a second rotating assembly;
wherein the second rotating assembly is disposed between the frame body and the temple and is fixedly connected to both the frame body and the temple, and the frame body and the temple are rotatably connected by the second rotating assembly.

Optionally, the second rotating assembly includes: a third connecting member and a fourth connecting member;
wherein the third connecting member is fixedly connected to the frame body, the fourth connecting member is fixedly connected to the temple, and the third connecting member and the fourth connecting member are rotatably connected.

Optionally, the third connecting member and the fourth connecting member are rotationally connected by a screw.

Optionally, the third connecting member and the frame body are integrally formed, and the fourth connecting member and the temple are integrally formed.

Optionally, the frame structure further includes: a fifth connecting member and a nose pad;
wherein one end of the fifth connecting member is fixedly connected to the frame body, and the other end of the fifth connecting member is connected to the nose pad.

Optionally, the fifth connecting member and the frame body are integrally formed.

Optionally, a material of the frame body includes a metal; and a material of the temple includes a rubber.

In another aspect, a wearable device is provided. The wearable device includes: a body structure and the frame structure according to the above aspect;

wherein the body structure is fixedly connected to the mounting bracket of the frame structure.

Optionally, the body structure includes: a drive assembly and a display screen;

wherein the drive assembly is connected to the display screen, and is configured to drive the display screen to display an image.

Optionally, the body structure includes at least one of a camera, a distance sensor, and a temperature sensor.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
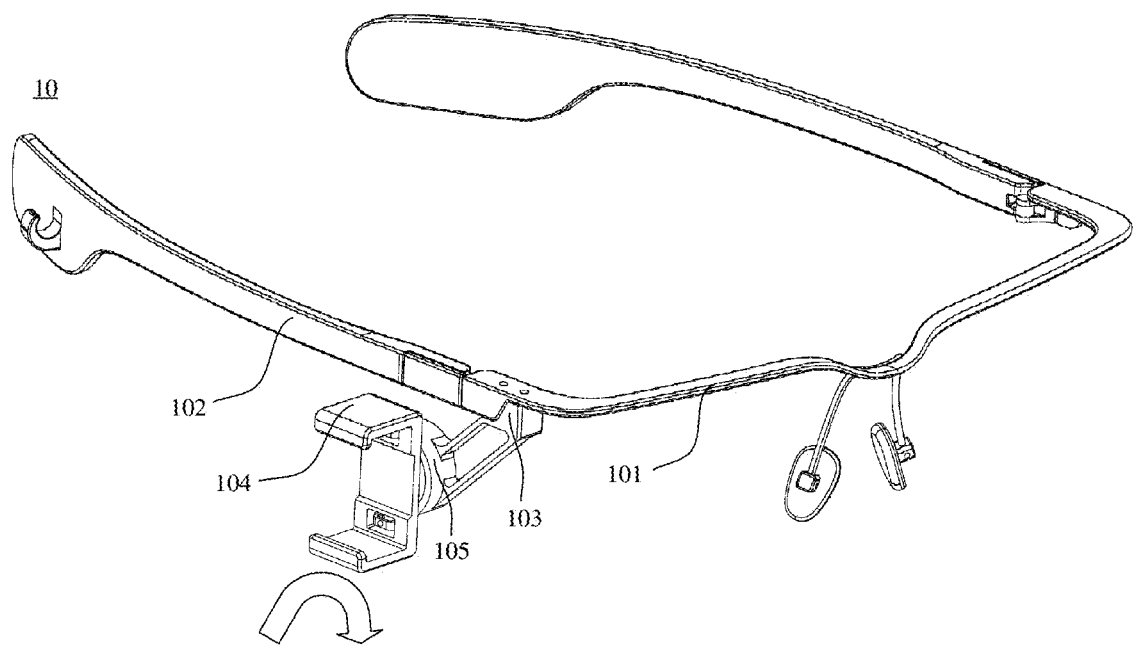
FIG. 1 is a schematic structural diagram of a frame structure of a wearable device according to an embodiment of the present disclosure.

For clearer descriptions of the objectives, technical solutions, and advantages of the present disclosure, embodiments of the present disclosure are described in detail hereinafter with reference to the accompanying drawings.

A wearable device generally includes a frame structure and a body structure. The frame structure includes a frame body and a temple that are connected to the frame body. The temple is connected to the body structure of the wearable device to fix the body structure.

The frame structure, as a fixing structure of the wearable device, has the advantages of lightness, thinness and easy storage. Thus, more and more small head wearable devices is taken the frame structure as a fixing accessory, and the body structure in the wearable device is fixed by the frame structure.

In a first case, where the wearable device is a virtual reality (VR) device or an augmented reality (AR) device, the body structure of the wearable device includes a display screen, a drive assembly, and an optical assembly. The drive assembly is a drive assembly configured to drive the display screen to display an image. The optical assembly is configured to transmit the image displayed on the display screen to eyes of a user wearing the wearable device. VR devices and AR devices may be collectively referred to as near-eye display devices. When the user wears the near-eye display device, the temple of the frame structure may be elastically deformed, which further causes changes in the relative position of the body structure and the human eyes. Thus, the reliability of the wearable device is poor.

For example, when the temple of the frame structure is elastically deformed, there is a deviation between an optical axis of the optical assembly and an optical axis of the human eye. Thus, an imaging range of the optical assembly may deviate from a movement range of the human eye, such that the user fails to clearly see the image displayed on the display screen, and edges of the image displayed on the display screen are missing.

In a second case, the wearable device is a device configured to take photos or videos, and the body structure of the wearable device is a camera or an action camera. When the user wears the wearable device, the elastic deformation of the temple of the frame structure may affect the stability of the body structure, and thus the reliability of the wearable device is poor.

In a third case, the wearable device is a device configured to measure temperature, and the body structure of the wearable device may be a temperature sensor. The wearable device is a device configured to measure distance, and the body structure of the wearable device may be a distance sensor. When the user wears the wearable device, the elastic deformation of the temple of the frame structure may affect the measurement accuracy of the body structure, and thus the reliability of the wearable device is poor.

The terms used in the embodiments of the present disclosure are only intended to explain the embodiments of the present disclosure, and are not intended to limit the present disclosure. Unless otherwise defined, technical or scientific terms used in the embodiments of the present disclosure shall have the ordinary meaning as understood by those of ordinary skill in the art to which the present disclosure belongs. The terms "First," "second," "third," and the like used in the description and claims of the present disclosure do not indicate any order, quantity or importance, but are only intended to distinguish different assemblies. Likewise, the terms "a" or "an" and the like do not indicate a quantitative limitation, but are intended to indicate the presence of at least one. The terms "comprising" or "including" mean that elements or objects appearing before "comprising" or "including" cover elements or objects listed after "comprising" or "including" and their equivalents, and do not exclude other elements or objects.

The embodiments of the present disclosure provide a frame structure of a wearable device, which can solve the problem of poor reliability of the wearable device in the related art. Referring to FIG. 1, the frame structure 10 may include a frame body 101, a temple 102, a fixing bracket 103, and a mounting bracket 104.

The temple 102 is rotatably connected to the frame body 101. The fixing bracket 103 is fixedly connected to the frame body 101. The mounting bracket 104 is disposed on a side, distal from the frame body 101, of the fixing bracket 103. The mounting bracket 104 is rotatably connected to the fixing bracket 103. The mounting bracket 104 is configured to be fixedly connected to a body structure of the wearable device.

As the body structure of the wearable device is connected to the mounting bracket 104, the mounting bracket 104 is connected to the fixing bracket 103, and the fixing bracket 103 is connected to the frame body 101, the body structure is connected to the frame body 101 by the mounting bracket 104 and the fixing bracket 103. That is, the body structure is not connected to the temple 102 of the frame structure. Therefore, when the user wears the wearable device, the elastic deformation of the temple 102 may not affect the position of the body structure, thereby preventing the relative position of the body structure and the human eye from changing. Thus, the reliability of the wearable device is great.

In addition, the body structure is connected to the frame body 101 by the mounting bracket 104 and the fixing bracket 103, which may not affect the rotational connection between the temple 102 and the frame body 101, and may facilitate the folding and storage of the wearable device. In this case, as the mounting bracket 104 connected to the body structure and the fixing bracket 103 connected to the frame body 101 are rotatably connected, the relative position of the body structure and the frame body 101 can be adjusted by adjusting the rotation of the mounting bracket 104 and the fixing bracket 103 when the user wears the wearable device. Thus, the wearable device possesses great flexibility and can be easily adjusted by the user according to the actual situation, and thus the user experience is great.

In summary, the embodiments of the present disclosure provide a frame structure of a wearable device. A body structure of the wearable device is connected to a frame body by a mounting bracket and a fixing bracket of the frame structure, which reduces the effect of the elastic deformation of a temple on the position of the body structure when the user wears the wearable device. Thus, the reliability of the wearable device is great.

Referring to FIG. 1, a rotation direction of the mounting bracket 104 relative to the fixing bracket 103 may be a clockwise direction. The rotation direction of the mounting bracket 104 relative to the fixing bracket 103 may further be a counterclockwise direction, which is not limited in the embodiments of the present disclosure.

Figure 2:
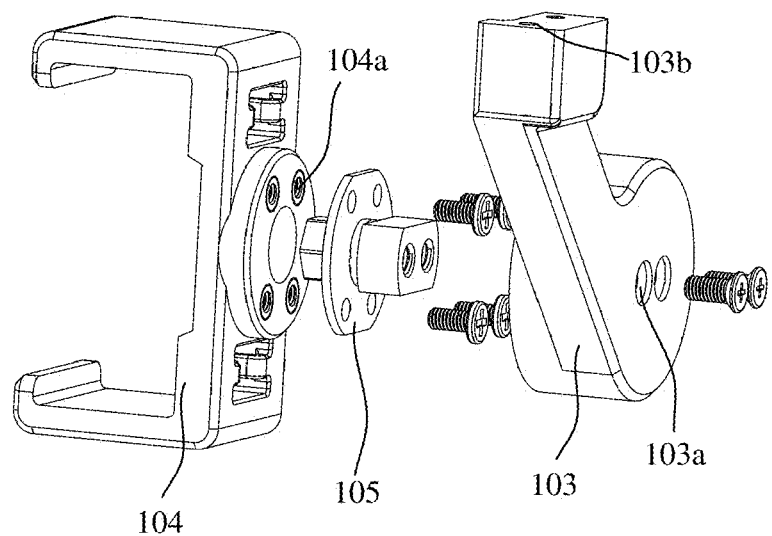
FIG. 2 is a schematic diagram of a mounting bracket, a first rotating assembly, and a fixing bracket according to an embodiment of the present disclosure.

Optionally, in conjunction with FIGS. 1 and 2, the frame structure 10 may further include a first rotating assembly 105. The first rotating assembly 105 may be disposed between the fixing bracket 103 and the mounting bracket 104. Moreover, the first rotating assembly 105 may be fixedly connected to both the fixing bracket 103 and the mounting bracket 104, and the mounting bracket 104 and the fixing bracket 103 may be rotatably connected by the first rotating assembly 105.

Figure 3:
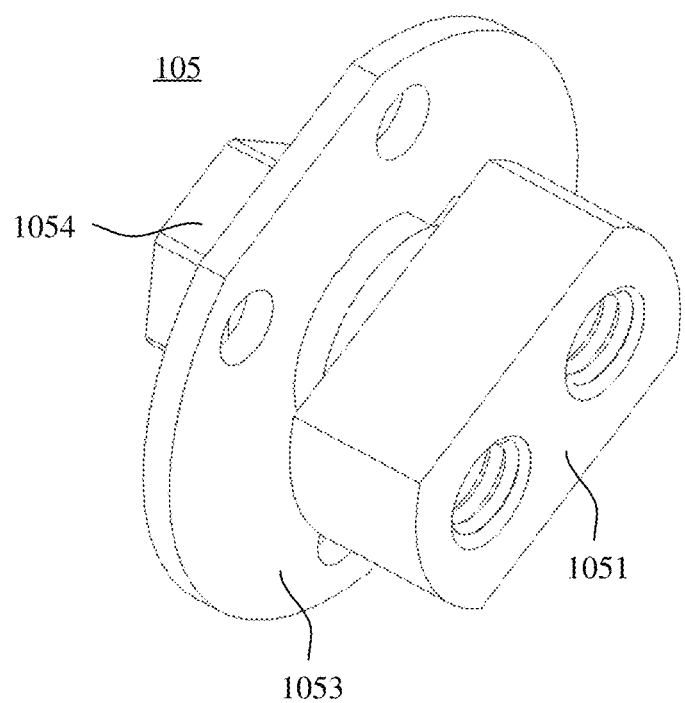
FIG. 3 is a schematic structural diagram of a first rotating assembly according to an embodiment of the present disclosure.
Figure 4:
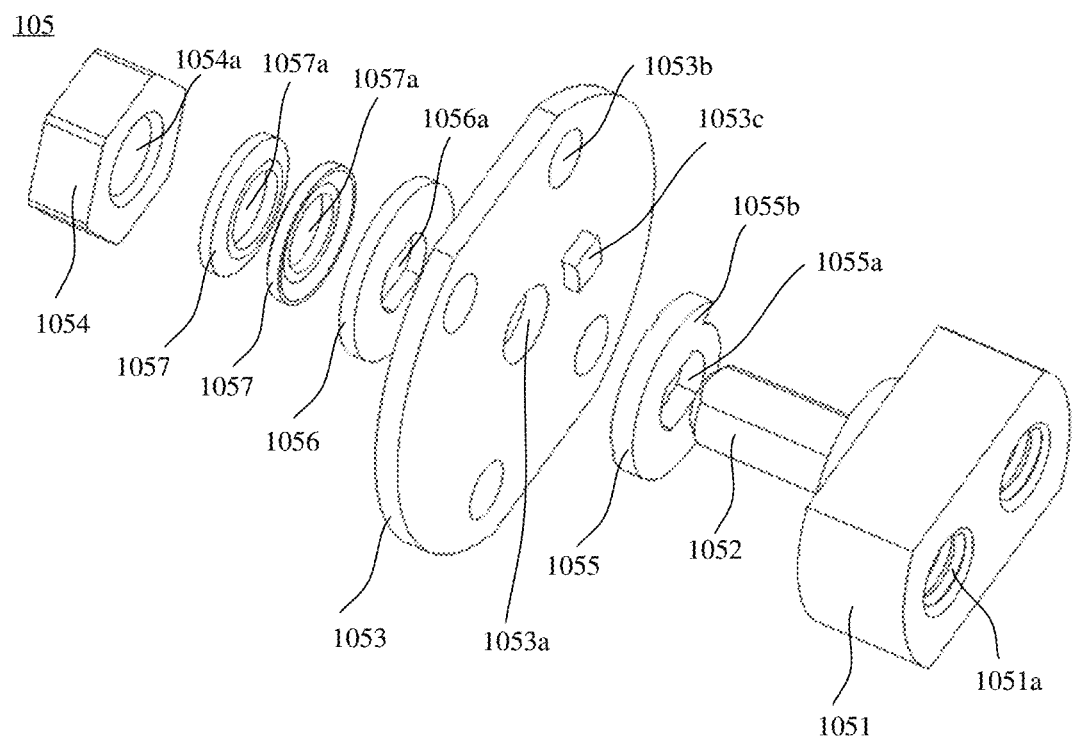
FIG. 4 is a schematic diagram of an exploded view of the first rotating assembly shown in FIG. 3.

FIG. 3 is a schematic structural diagram of a first rotating assembly according to an embodiment of the present disclosure. FIG. 4 is a schematic diagram of an exploded view of the first rotating assembly shown in FIG. 3. In conjunction with FIGS. 3 and 4, it can be seen that the first rotating assembly 105 may include a first fixing member 1051, a first connecting member 1052 in a rod shape, a second fixing member 1053, and a second connecting member 1054 that are arranged in sequence.

One side of the first fixing member 1051 may be fixedly connected to the fixing bracket 103, and the other side of the first fixing member 1051 may be fixedly connected to one end of the first connecting member 1052. The second fixing member 1053 is provided with a first through hole 1053a, and the other end of the first connecting member 1052 may be fixedly connected to the second connecting member 1054 through the first through hole 1053a. The second fixing member 1053 is fixedly connected to the mounting bracket 104.

The first connecting member 1052 and the first fixing member 1051 are integrally formed, or one end of the first connecting member 1052 may be fixedly connected to the other side of the first fixing member 1051 by welding.

Optionally, in conjunction with FIGS. 2 to 4, the fixing bracket 103 may be provided with a first connecting hole 103a, and one side of the first fixing member 1051 is provided with a second connecting hole 1051a corresponding to the first connecting hole 103a on the fixing bracket 103. A screw is connected to the second connecting hole 1051a on the first fixing member 1051 through the first connecting hole 103a on the fixing bracket 103, so as to realize the fixed connection between the first rotating assembly 105 and the fixing bracket 103.

In some exemplary embodiments, in FIGS. 2 to 4, the fixing bracket 103 is provided with two first connecting holes 103a, and one side of the first fixing member 1051 is provided with two corresponding second connecting holes 1051a. The first connecting hole 103a may be an optical hole, and the second connecting hole 1051a may be a threaded hole.

The mounting bracket 104 is provided with a third connecting hole 104a, and the second fixing member 1053 is provided with a fourth connecting hole 1053b corresponding to the third connecting hole 104a on the mounting bracket 104. The screw is connected to the third connecting hole 104a on the mounting bracket 104 through the fourth connecting hole 1053b on the second fixing member 1053, so as to realize the fixed connection between the first rotating assembly 105 and the mounting bracket 104.

In some exemplary embodiments, in FIGS. 2 to 4, the mounting bracket 104 is provided with four third connecting holes 104a, and the second fixing member 1053 is provided with four corresponding fourth connecting holes 1053b. The fourth connecting hole 1053b may be the optical hole, and the third connecting hole 104a may be the threaded hole.

As the first fixing member 1051 and the second fixing member 1053 are disposed opposite to each other and are not fixedly connected, the first fixing member 1051 and the second fixing member 1053 may be rotated relative to each other. Therefore, when the user wears the wearable device, the relative rotation of the mounting bracket 104 and the fixing bracket 103 may be realized by rotating the mounting bracket 104 connected to the second fixing member 1053, and the relative position between the body structure and the frame body 101 may be further adjusted. For example, the body structure and the frame body 101 may further be rotated relative to each other.

Optionally, a relative rotation angle of the mounting bracket 104 and the fixing bracket 103 ranges from 0 degree to 60 degrees. A relative rotation angle of the body structure and the frame body 101 ranges from 0 degree to 60 degrees.

Referring to FIG. 4, the first rotating assembly 105 may further include a limiting member 1055 disposed between the first fixing member 1051 and the second fixing member 1053. The limiting member 1055 may be provided with a second through hole 1055*a*. The other end of the first connecting member 1052 may be fixedly connected to the second connecting member 1054 through the second through hole 1055*a* and the first through hole 1053*a*.

Optionally, the second connecting member 1054 may be provided with a fifth through hole 1054*a*, and the other end of the first connecting member 1052 is connected to the fifth through hole 1054*a* through the second through hole 1055*a* and the first through hole 1053*a*. The other end of the first connecting member 1052 may be provided with external threads, and the fifth through hole 1054*a* may be provided with internal threads. The other end of the first connecting member 1052 and the fifth through hole 1054*a* may be connected by threads.

As the limiting member 1055 is not fixedly connected to the second fixing member 1053, the limiting member 1055 and the second fixing member 1053 may be rotated relative to each other. In addition, by adjusting the threaded connection between the second connecting member 1054 and the first connecting member 1052, the contact tightness between the limiting member 1055 and the second fixing member 1053 can be adjusted, and the relative rotation damping of the limiting member 1055 and the second fixing member 1053 can be adjusted. By adjusting to an appropriate rotation damping, the relative rotation of the mounting bracket 104 and the fixing bracket 103 can be achieved, and the position of the body structure of the wearable device can be fixed after the rotation, such that the position of the body structure is prevented from changing due to movement or touch, and the reliability of the wearable device is ensured.

Referring to FIG. 4, it can further be seen that one side, proximal to the limiting member 1055, of the second fixing member 1053 may be provided with a limiting boss 1053*c*, and the limiting member 1055 is provided with a limiting portion 1055*b*. The limiting boss 1053*c* may be configured to be engaged with the limiting portion 1055*b* to limit the rotation angle of the limiting portion 1055*b*. For example, when the limiting portion 1055*b* is engaged with the limiting boss 1053*c*, the limiting portion 1055*b* cannot be rotated to the side proximal to the limiting boss 1053*c*, but can only be rotated to the side distal from the limiting boss 1053*c*.

In the embodiments of the present disclosure, referring to FIG. 4, the first rotating assembly 105 may further include a first gasket 1056 and a second gasket 1057. The first gasket 1056 is disposed between the second fixing member 1053 and the second connecting member 1054. The second gasket 1057 is disposed between the first gasket 1056 and the second connecting member 1054. One side of the first gasket 1056 is in contact with the second fixing member 1053, the other side of the first gasket 1056 is in contact with one side of the second gasket 1057, and the other side of the second gasket 1057 is in contact with the second connecting member 1054. Two second gaskets 1057 are shown in FIG. 4.

By disposing the first gasket 1056 on a side, distal from the limiting member 1055, of the second fixing member 1053, the first gasket 1056 and the limiting member 1055 can be symmetrical with respect to the second fixing member 1053, and thus the symmetry of the first rotating assembly 105 can be ensured. Materials of the limiting member 1055 and the first gasket 1056 may both include a metal.

Optionally, a material of the second gasket 1057 includes a rubber. The second gasket 1057 is disposed between the first gasket 1056 and the second connecting member 1054, such that the tightness between the second connecting member 1054 and the first gasket 1056 is ensured.

In the embodiments of the present disclosure, the first gasket 1056 is provided with a sixth through hole 1056*a*, and the second gasket 1057 is provided with a seventh through hole 1057*a*, such that the first connecting member 1052 is connected to the second connecting member 1054 through the second through hole 1055*a*, the first through hole 1053*a*, the sixth through hole 1056*a*, and the seventh through hole 1057*a*.

Figure 5:
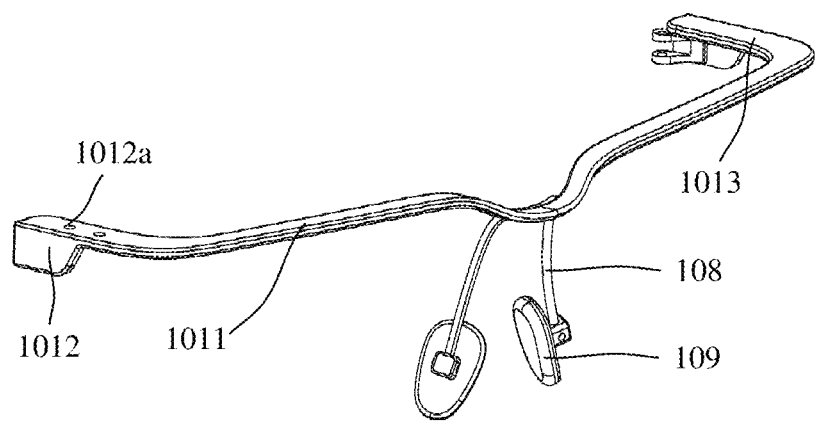
FIG. 5 is a schematic structural diagram of a frame body according to an embodiment of the present disclosure.
Figure 6:
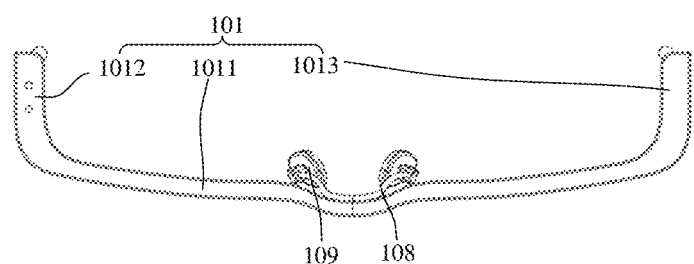
FIG. 6 is a top view of the frame body shown in FIG. 5.
Figure 7:
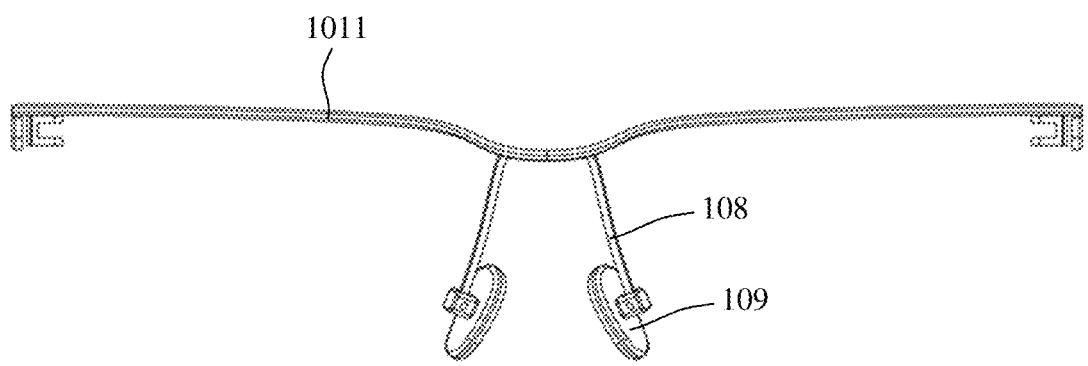
FIG. 7 is a front view of the frame body shown in FIG. 5.
Figure 8:
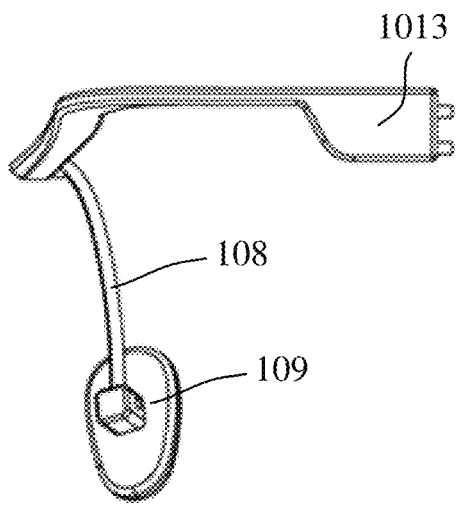
FIG. 8 is a right side view of the frame body shown in FIG. 5.

FIG. 5 is a schematic structural diagram of a frame body according to an embodiment of the present disclosure. FIG. 6 is a top view of the frame body shown in FIG. 5. FIG. 7 is a front view of the frame body shown in FIG. 5. FIG. 8 is a right side view of the frame body shown in FIG. 5. In conjunction with FIGS. 5 to 8, the frame body 101 may include a frame beam 1011, and a first connecting portion 1012 and a second connecting portion 1013 that are disposed at both ends of the frame beam 1011.

One end of the frame beam 1011 may be fixedly connected to the first connecting portion 1012, and the other end of the frame beam 1011 may be fixedly connected to the second connecting portion 1013. The fixing bracket 103 may be fixedly connected to the first connecting portion 1012, so as to achieve the fixed connection between the fixing bracket 103 and the frame body 101.

Optionally, the frame beam 1011, the first connecting portion 1012, and the second connecting portion 1013 may be integrally formed. The material of the frame body 101 may include the metal. For example, the material of the frame body 101 is copper or a titanium alloy, and the like.

In the embodiments of the present disclosure, the frame structure 10 includes two temples 102. One of the temples 102 is connected to the first connecting portion 1012, and the other temple 102 is connected to the second connecting portion 1013. The first connecting portion 1012 and the second connecting portion 1013 can absorb the stress when the temples 102 are elastically deformed, such that the elastic deformation of the frame beam 1011 of the frame body can be avoid, and the reliability of the frame structure 10 is great.

Figure 9:
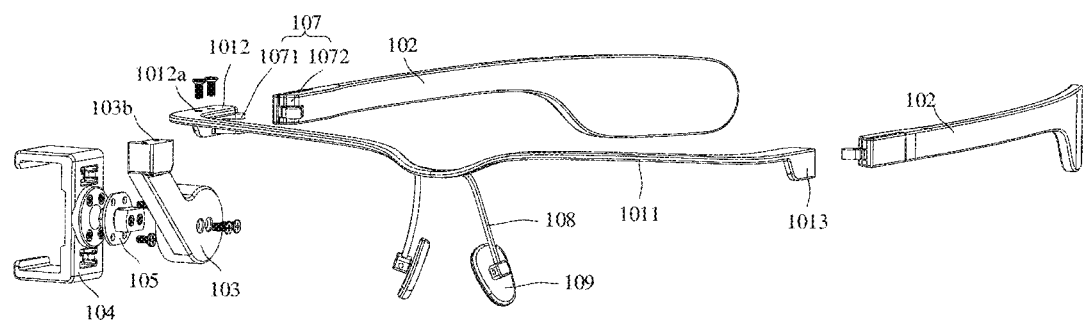
FIG. 9 is a schematic diagram of an exploded view of a frame structure according to an embodiment of the present disclosure.

In conjunction with FIGS. 2, 5 and 9, the fixing bracket 103 may be provided with a third through hole 103*b*, and the first connecting portion 1012 may be provided with a fourth through hole 1012*a*. The fixing bracket 103 and the first connecting portion 1012 are fixedly connected through the third through hole 103*b* and the fourth through hole 1012*a*. Two third through holes 103*b* and two fourth through holes 1012*a* are shown in FIG. 9.

Optionally, the fourth through hole 1012*a* may be the optical hole, and the third through hole 103*b* may be the threaded hole. The screw is in threaded connection to the third through hole 103*b* through the fourth through hole 1012*a*, so as to achieve the fixed connection between the fixing bracket 103 and the frame body 101.

Figure 10:
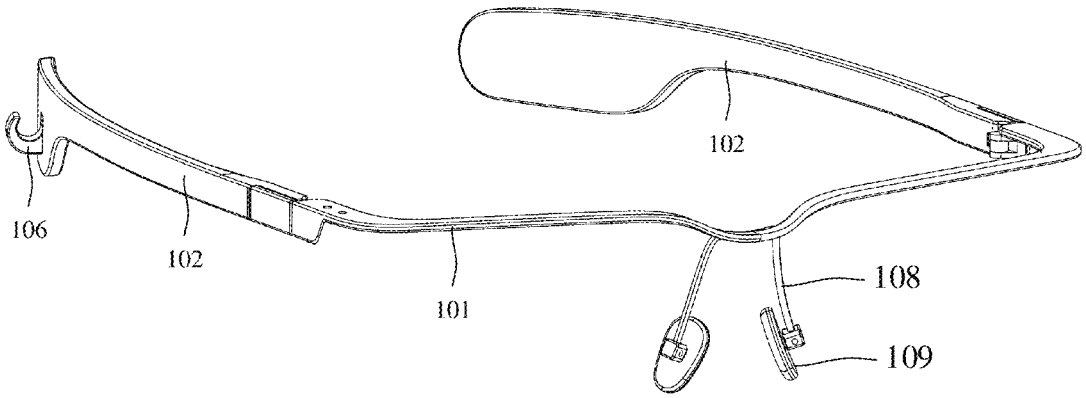
FIG. 10 is a schematic diagram of a frame body, a temple, and a wire clip according to an embodiment of the present disclosure.

In the embodiments of the present disclosure, referring to FIG. 10, the frame structure 10 may further include a wire clip 106. The wire clip 106 may be fixedly connected to the temple 102 to fix a data line of the body structure, so as to avoid the effect of the data line of the body structure on the normal use of the wearable device. The wire clip 106 may be fixedly connected to one end, distal from the frame body 101, of the temple 102.

Optionally, the frame structure 10 includes two temples 102, and the wire clip 106 may be fixedly connected to the temple 102 proximal to the fixing bracket 103, so as to fix the data line of the body structure. For example, the wire clip 106 may be integrally formed with the temple 102 proximal to the fixing bracket 103.

Optionally, the material of the temple 102 includes the rubber. For example, the material of the temple 102 includes a hard rubber material with great elasticity and thermoplastic polyurethane (TPU) elastomer rubber. An interior of the temple 102 is made of the hard rubber material with greater elasticity, and the TPU is covered on the outer side of the hard rubber material to ensure comfort in wearing. In addition, as the material of the temple 102 includes rubber, the temple 102 may be elastic to adapt to the users with different head circumferences, and has good flexibility.

Referring to FIG. 9, the frame structure 10 may further include a second rotating assembly 107. The second rotating assembly 107 may be disposed between the frame body 101 and the temple 102, and the second rotating assembly 107 is fixedly connected to both the frame body 101 and the temples 102. The frame body 101 and the temple 102 are rotatably connected by the second rotating assembly 107.

Referring to FIG. 9, the second rotating assembly 107 may include a third connecting member 1071 and a fourth connecting member 1072. The third connecting member 1071 may be fixedly connected to the frame body 101, and the fourth connecting member 1072 may be fixedly connected to the temple 102. The third connecting member 1071 and the fourth connecting member 1072 are rotatably connected.

Optionally, the third connecting member 1071 is fixed to the frame body 101 by bonding, welding or integral molding. The fourth connecting member 1072 is fixed to the temple 102 by bonding, welding or integral molding. The third connecting member 1071 may be integrally formed with the frame body 101. The fourth connecting member 1072 may be integrally formed with the temple 102. The materials of the third connecting member 1071 and the fourth connecting member 1072 may both include the metal. For example, the materials of the third connecting member 1071 and the fourth connecting member 1072 are copper or the titanium alloy.

Figure 11:
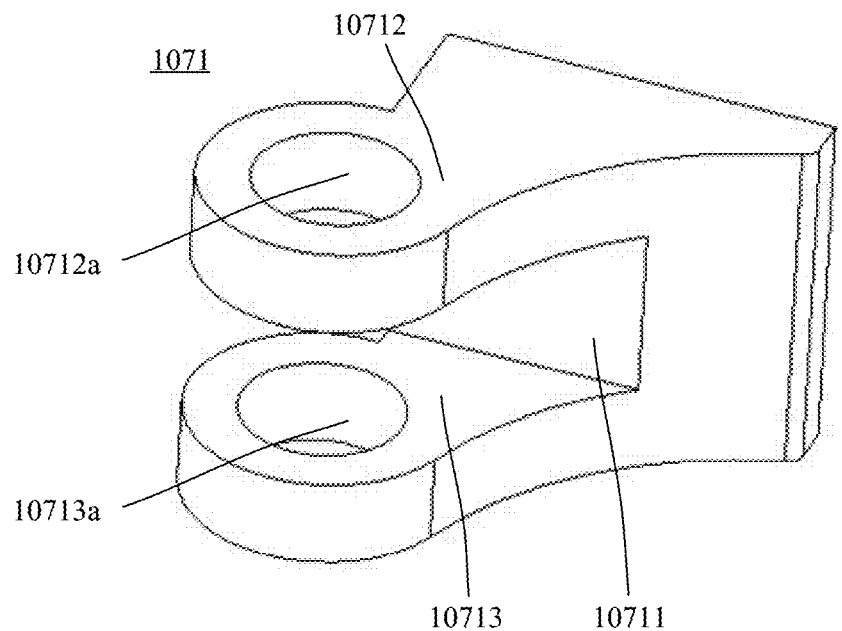
FIG. 11 is a schematic structural diagram of a third connecting member according to an embodiment of the present disclosure.

FIG. 11 is a schematic structural diagram of a third connecting member according to an embodiment of the present disclosure. Referring to FIG. 11, the third connecting member 1071 includes a first fixing plate 10711, and a first connecting plate 10712 and a second connecting plate 10713 that are fixedly connected to the first fixing plate 10711. The first connecting plate 10712 and the second connecting plate 10713 are arranged in parallel and spaced apart, and the first connecting plate 10712 is perpendicular to the first fixing plate 10711. The first connecting plate 10712 is provided with an eighth through hole 10712a, and the second connecting plate 10713 is provided with a ninth through hole 10713a.

Figure 12:
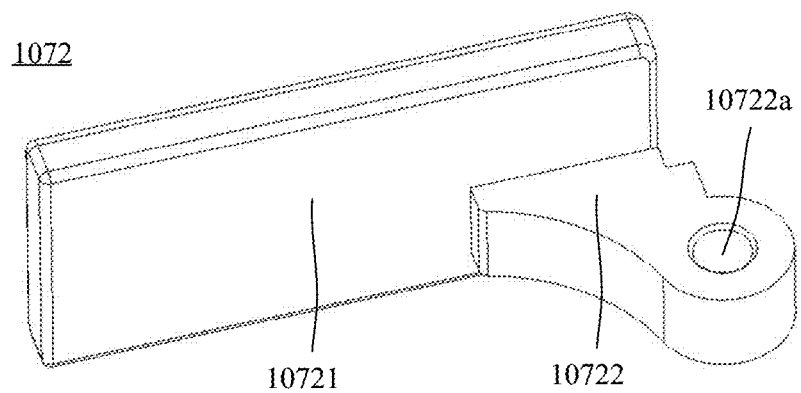
FIG. 12 is a schematic structural diagram of a fourth connecting member according to an embodiment of the present disclosure.

FIG. 12 is a schematic structural diagram of a fourth connecting member according to an embodiment of the present disclosure. Referring to FIG. 12, the fourth connecting member 1072 includes a second fixing plate 10721 and a third connecting plate 10722 fixedly connected to the second fixing plate 10721. The third connecting plate 10722 is perpendicular to the second fixing plate 10721. The third connecting plate 10722 is provided with a tenth through hole 10722a.

In the embodiments of the present disclosure, the third connecting plate 10722 is disposed between the first connecting plate 10712 and the second connecting plate 10713. The screw may connect the third connecting member 1071 to the fourth through hole 1072 through the eighth through hole 10712a on the first connecting plate 10712, the tenth through hole 10722a on the third connecting plate 10722 and the ninth through hole 10713a on the second connecting plate 10713. In addition, after the third connecting member 1071 and the fourth connecting member 1072 are connected by screws, the third connecting member 1071 and the fourth connecting member 1072 may be rotated relative to each other.

Referring to FIGS. 5 to 10, it can be seen that the frame structure 10 may further include a fifth connecting member 108 and a nose pad 109. One end of the fifth connecting member 108 may be fixedly connected to the frame body 101, and the other end of the fifth connecting member 108 may be connected to the nose pad 109. The nose pad 109 may be worn by the user, so as to achieve the support of the user for the frame structure 10.

Optionally, the fifth connecting member 108 may be integrally formed with the frame body 101. The material of the fifth connecting member 108 may be the same as the material of the frame body 101. Optionally, the material of the fifth connecting member 108 may be the metal, such as copper or the titanium alloy.

In summary, the embodiments of the present disclosure provide a frame structure of a wearable device. A body structure of the wearable device is connected to a frame body by a mounting bracket and a fixing bracket of the frame structure, which reduces the effect of the elastic deformation of a temple on the position of the body structure when the user wears the wearable device. Thus, the reliability of the wearable device is great.

Figure 13:
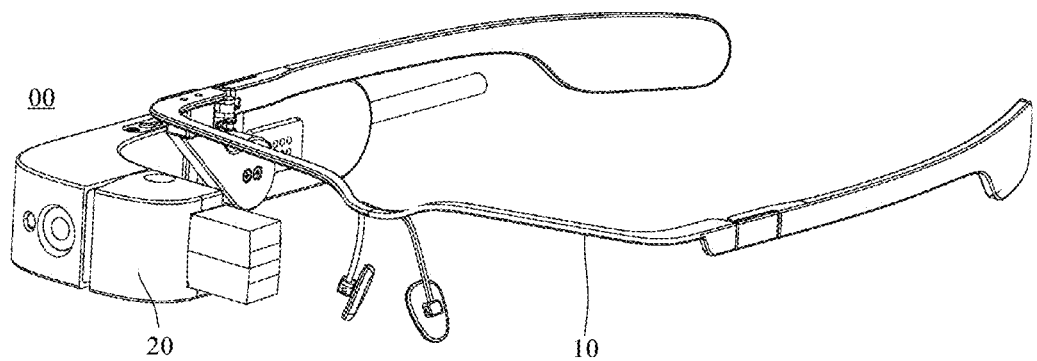
FIG. 13 is a schematic structural diagram of a wearable device according to an embodiment of the present disclosure.

FIG. 13 is a schematic structural diagram of a wearable device according to an embodiment of the present disclosure. Referring to FIG. 13, the wearable device 00 may include a body structure 20 and the frame structure 10 according to the above embodiments. The body structure 20 may be fixedly connected to the mounting bracket 104 of the frame structure 10.

Figure 14:
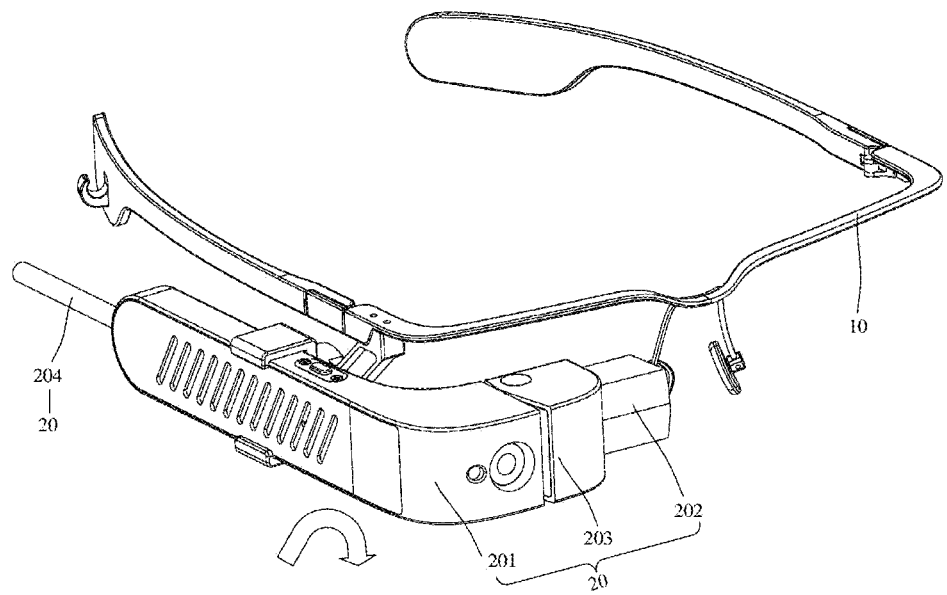
FIG. 14 is a schematic structural diagram of another wearable device according to an embodiment of the present disclosure.

As an optional implementation, referring to FIG. 14, the body structure 20 may include a drive assembly 201 and a display screen 202. The drive assembly 201 may be connected to the display screen 202 to drive the display screen 202 to display an image. In this case, the wearable device may be a VR device or an AR device. The drive assembly 201 of the body structure is fixedly connected to the mounting bracket 104 of the frame structure.

Optionally, the body structure 20 may further include an optical assembly 203 connected to the drive assembly 201. The optical assembly 203 is configured to transmit the image displayed on the display screen 202 to eyes of the user wearing the wearable device.

Referring to FIG. 14, the body structure 20 may further include a data line 204 connected to the drive assembly 201. The data line 204 is disposed at one end, distal from the display screen 202, of the drive assembly 201. The data line 204 may be fixed by the wire clip 106 in the frame structure 10 to ensure the normal use of the wearable device 00.

Figure 15:
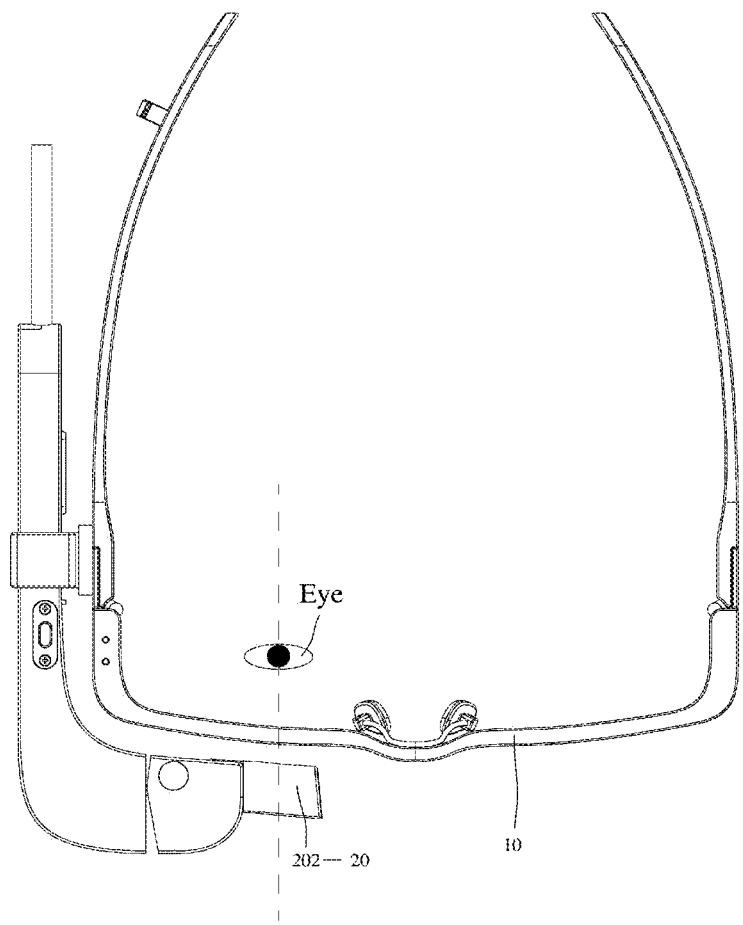
FIG. 15 is a top view of a wearable device according to an embodiment of the present disclosure.

FIG. 15 is a top view of a wearable device according to an embodiment of the present disclosure. Referring to FIG. 15, when the user wears the wearable device 00, an axis of one eye of the user may be collinear with an axis of the display screen 202 to view the image displayed on the display screen 202, and the other eye of the user may see the external sight.

As the drive assembly 201 of the body structure 20 of the wearable device 00 is connected to the frame body 101 by the mounting bracket 104, the elastic deformation of the temple 102 may not affect the position of the drive assembly when the user wears the wearable device 00. Furthermore, the deviation between the optical axis of the optical assembly 203 and the optical axis of the human eye can be avoided, such that the user can clearly see the image displayed on the display screen 202, and the reliability of the wearable device is great.

In addition, when the user wears the wearable device, the relative rotation of the mounting bracket 104 and the fixing bracket 103 causes the relative rotation of the body structure and the frame body 101, such that the user can make adjustments according to the actual situation to ensure the integrity of the image displayed on the display screen.

Figure 16:
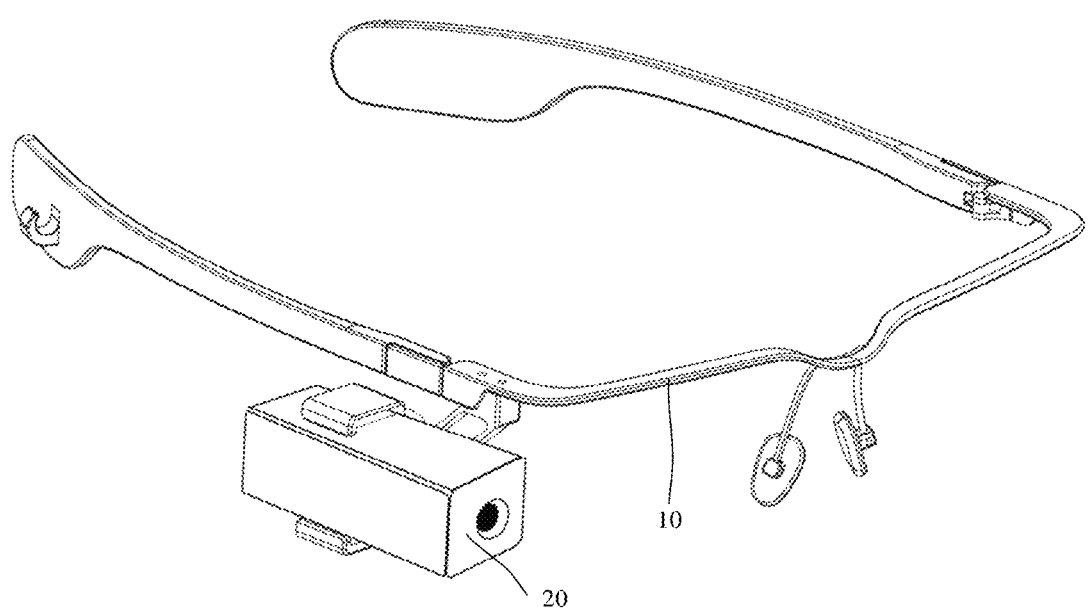
FIG. 16 is a schematic structural diagram of another wearable device according to an embodiment of the present disclosure.

In another optional implementation, the body structure may include at least one of a camera, a distance sensor, and a temperature sensor. For example, referring to FIG. 16, the body structure 20 may include the camera.

In the case that the body structure 20 includes the camera, the wearable device 00 may be a device configured to take photos or videos. As the camera of the wearable device is connected to the frame body 101 by the mounting bracket 104, when the user wears the wearable device 00, the elastic deformation of the temple 102 in the frame structure 10 may not affect the stability of the camera, and the reliability of the wearable device 00 is great.

In the case that the body structure 20 includes the temperature sensor, the wearable device 00 may be a device configured to measure temperature. In the case that the body structure 20 includes the distance sensor, the wearable device 00 may be a device configured to measure distance. As the sensor (the temperature sensor or the distance sensor) of the wearable device 00 is connected to the frame body 101 by the mounting bracket 104, when the user wears the wearable device 00, the elastic deformation of the temples 102 in the frame structure 10 may not affect the measurement accuracy of the camera, and the reliability of the wearable device 00 is great.

Described above are merely optional embodiments of the present disclosure, and are not intended to limit the present disclosure. Any modifications, equivalent substitutions, improvements, and the like within the spirit and principles of the disclosure shall fall within the protection scope of the present disclosure.

What is claimed is:

1. A frame structure of a wearable device, comprising:
a frame body;
a temple rotatably connected to the frame body;
a fixing bracket fixedly connected to the frame body; and
a mounting bracket disposed on a side, distal from the frame body, of the fixing bracket and rotatably connected to the fixing bracket; wherein the mounting bracket is configured to be fixedly connected to a body structure of the wearable device;
wherein the frame structure further comprises: a first rotating assembly; wherein the first rotating assembly is disposed between the fixing bracket and the mounting bracket, and the mounting bracket and the fixing bracket are rotatably connected by the first rotating assembly; wherein
the first rotating assembly comprises: a first fixing member, a first connecting member in a rod shape, a second fixing member, and a second connecting member that are arranged in sequence; wherein
the fixing bracket is provided with a plurality of first connecting holes, one side of the first fixing member is provided with a plurality of second connecting holes corresponding to the plurality of first connecting holes, and screws are connected to the second connecting holes through the first connecting holes, the first connecting holes being optical holes, and the second connecting holes being threaded holes;
the other side of the first fixing member is fixedly connected to one end of the first connecting member;
the second fixing member is provided with a first through hole, and the other end of the first connecting member is fixedly connected to the second connecting member through the first through hole; and
the mounting bracket is provided with a plurality of third connecting holes, the second fixing member is provided with a plurality of fourth connecting holes corresponding to the plurality of third connecting holes, and screws are connected to the third connecting holes through the fourth connecting holes, the fourth connecting holes being optical holes, and the third connecting holes being threaded holes.

2. The frame structure according to claim 1, wherein the first rotating assembly further comprises: a limiting member disposed between the first fixing member and the second fixing member, wherein the limiting member is provided with a second through hole and a limiting portion;
the other end of the first connecting member is fixedly connected to the second connecting member through the second through hole and the first through hole; and
a side, proximal to the limiting member, of the second fixing member is provided with a limiting boss, wherein the limiting boss is configured to be engaged with the limiting portion.

3. The frame structure according to claim 1, wherein the first rotating assembly further comprises: a first gasket and a second gasket; wherein
the first gasket is disposed between the second fixing member and the second connecting member, and the second gasket is disposed between the first gasket and the second connecting member; and
one side of the first gasket is in contact with the second fixing member, the other side of the first gasket is in contact with one side of the second gasket, and the other side of the second gasket is in contact with the second connecting member.

4. The frame structure according to claim 1, wherein the frame body comprises: a frame beam, and a first connecting portion and a second connecting portion that are disposed at both ends of the frame beam; wherein
one end of the frame beam is fixedly connected to the first connecting portion, and the other end of the frame beam is fixedly connected to the second connecting portion; and
the fixing bracket is fixedly connected to the first connecting portion.

5. The frame structure according to claim 4, wherein the fixing bracket is provided with a third through hole, the first connecting portion is provided with a fourth through hole, and the fixing bracket and the first connecting portion are fixedly connected through the third through hole and the fourth through hole.

6. The frame structure according to claim 1, further comprising: a wire clip;
   wherein the wire clip is fixedly connected to the temple, and is configured to fix a data line of the body structure.

7. The frame structure according to claim 6, wherein the wire clip is fixedly connected to an end, distal from the frame body, of the temple.

8. The frame structure according to claim 6, wherein the wire clip and the temple are integrally formed.

9. The frame structure according to claim 1, further comprising: a second rotating assembly;
   wherein the second rotating assembly is disposed between the frame body and the temple and is fixedly connected to both the frame body and the temple, and the frame body and the temple are rotatably connected by the second rotating assembly.

10. The frame structure according to claim 9, wherein the second rotating assembly comprises: a third connecting member and a fourth connecting member;
    wherein the third connecting member is fixedly connected to the frame body, the fourth connecting member is fixedly connected to the temple, and the third connecting member and the fourth connecting member are rotatably connected.

11. The frame structure according to claim 10, wherein the third connecting member and the fourth connecting member are rotatably connected by a screw.

12. The frame structure according to claim 10, wherein the third connecting member and the frame body are integrally formed, and the fourth connecting member and the temple are integrally formed.

13. The frame structure according to claim 1, further comprising: a fifth connecting member and a nose pad;
    wherein one end of the fifth connecting member is fixedly connected to the frame body, and the other end of the fifth connecting member is connected to the nose pad.

14. The frame structure according to claim 13, wherein the fifth connecting member and the frame body are integrally formed.

15. The frame structure according to claim 1, wherein a material of the frame body comprises a metal; and a material of the temple comprises a rubber.

16. A wearable device, comprising: a body structure and a frame structure comprising: a frame body; a temple rotatably connected to the frame body; a fixing bracket fixedly connected to a frame body; and a mounting bracket disposed on a side, distal from the frame body, of the fixing bracket and rotatably connected to the fixing bracket; wherein the frame structure further comprises: a first rotating assembly; wherein the first rotating assembly is disposed between the fixing bracket and the mounting bracket, and the mounting bracket and the fixing bracket are rotatably connected by the first rotating assembly; wherein
   the first rotating assembly comprises: a first fixing member, a first connecting member in a rod shape, a second fixing member, and a second connecting member that are arranged in sequence; wherein
   the fixing bracket is provided with a plurality of first connecting holes, one side of the first fixing member is provided with a plurality of second connecting holes corresponding to the plurality of first connecting holes, and screws are connected to the second connecting holes through the first connecting holes, the first connecting holes being optical holes, and the second connecting holes being threaded holes;
   the other side of the first fixing member is fixedly connected to one end of the first connecting member;
   the second fixing member is provided with a first through hole, and the other end of the first connecting member is fixedly connected to the second connecting member through the first through hole; and
   the mounting bracket is provided with a plurality of third connecting holes, the second fixing member is provided with a plurality of fourth connecting holes corresponding to the plurality of third connecting holes, and screws are connected to the third connecting holes through the fourth connecting holes, the fourth connecting holes being optical holes, and the third connecting holes being threaded holes;
   wherein the body structure is fixedly connected to the mounting bracket of the frame structure.

17. The wearable device according to claim 16, wherein the body structure comprises: a drive assembly and a display screen;
    wherein the drive assembly is connected to the display screen, and is configured to drive the display screen to display an image.

18. The wearable device according to claim 16, wherein the body structure comprises at least one of a camera, a distance sensor, and a temperature sensor.

* * * * *